United States Patent [19]

Ward

[11] 4,026,801
[45] May 31, 1977

[54] COMBINATION WATER SOFTENER CABINET AND BRINE RECEPTACLE

[75] Inventor: George G. Ward, Deerfield, Ill.

[73] Assignee: Duratainer Inc., Windsor, Wis.

[22] Filed: Jan. 8, 1976

[21] Appl. No.: 647,613

[52] U.S. Cl. ............................... 210/140; 210/190
[51] Int. Cl.² ............................................ C02B 1/42
[58] Field of Search .............. 210/190, 191, 30, 24, 210/32, 232, 234, 140; 99/DIG. 2, 467, 468

[56] References Cited

UNITED STATES PATENTS

| | | | |
|---|---|---|---|
| 2,767,139 | 10/1956 | Hagman | 210/191 |
| 3,253,713 | 5/1966 | Kryzer | 210/191 |
| 3,374,891 | 3/1968 | Buchman | 210/191 |
| 3,476,247 | 11/1969 | Rose | 210/191 |

FOREIGN PATENTS OR APPLICATIONS

| | | | |
|---|---|---|---|
| 2,029,170 | 12/1971 | Germany | 210/190 |

*Primary Examiner*—Thomas G. Wyse
*Assistant Examiner*—Benoit Castel
*Attorney, Agent, or Firm*—Hill, Gross, Simpson, Van Santen, Steadman, Chiara & Simpson

[57] ABSTRACT

A combination water softener cabinet and brine tank is adapted to have a water softening resin tank housed therein in an area adjacent the rear wall, while an area within a forward portion of the cabinet and alongside the resin tank serves as a brine containing area. Reinforcing indentations in the molded plastic side walls of the cabinet cooperate with the rear wall of the cabinet and a socket structure on the bottom of the cabinet for retaining the resin tank against lateral displacement within the cabinet. A combination resin tank locating, retaining and hold-down device comprising a plate provides with upper structure of the cabinet an isolation chamber for protectively housing the softener cycle controlling mechanism mounted on the resin tank against brine fume damage and against contamination from salt during charging through an opening in the upper front portion of the tank.

6 Claims, 10 Drawing Figures

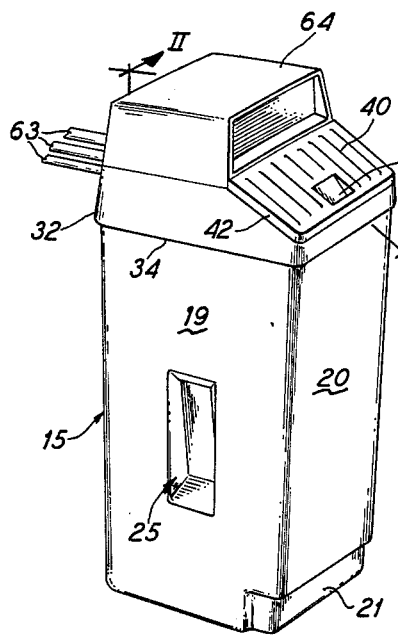
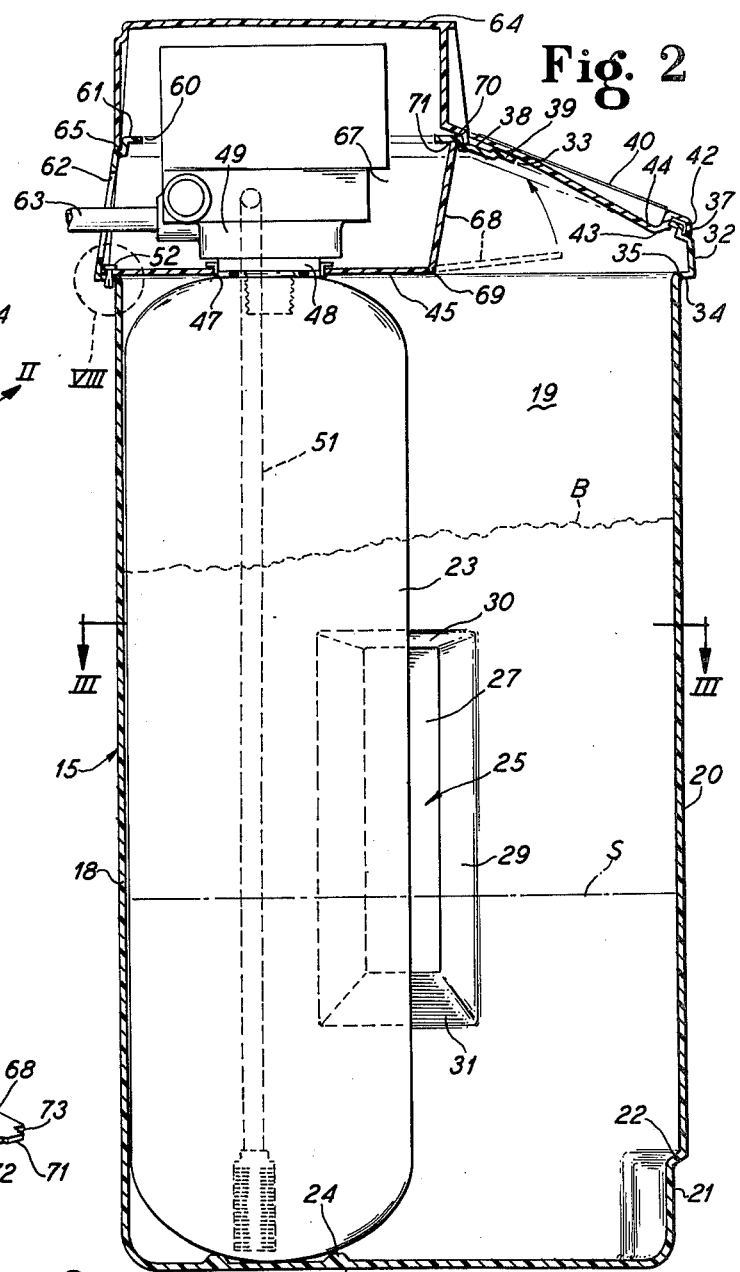
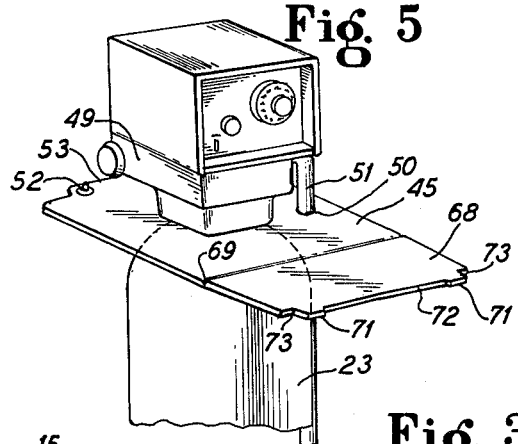
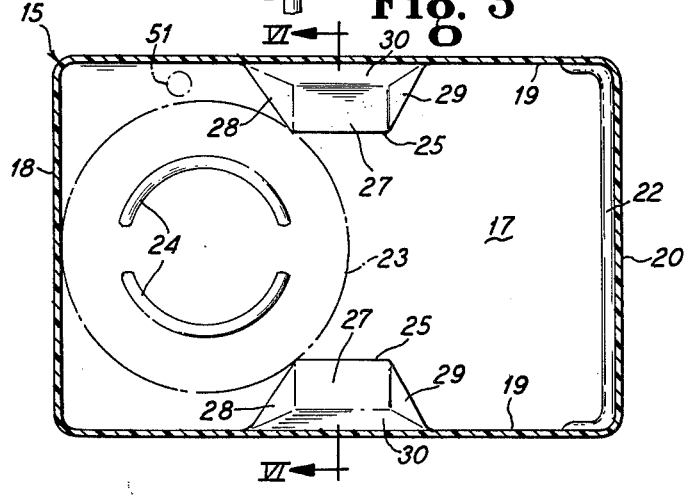
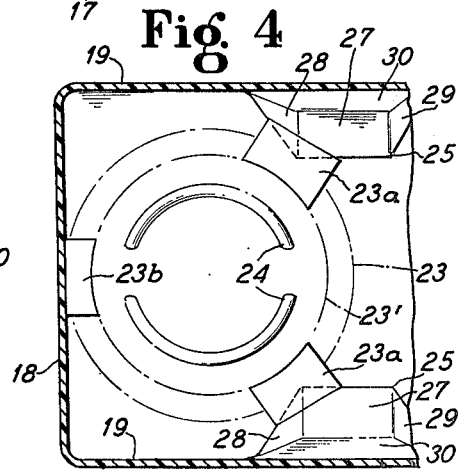

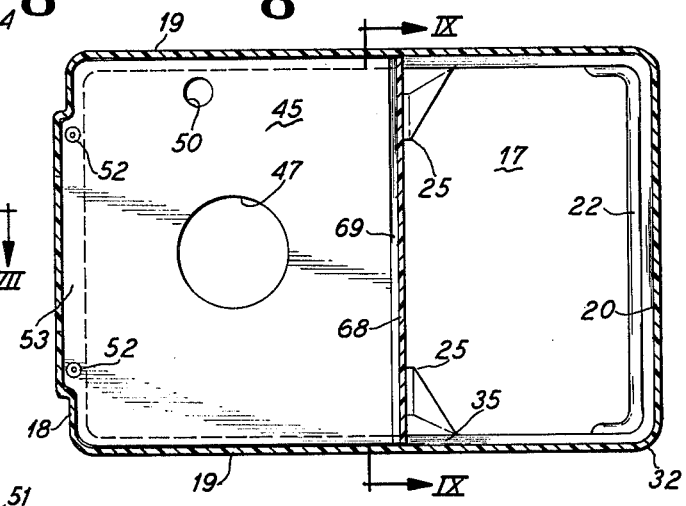
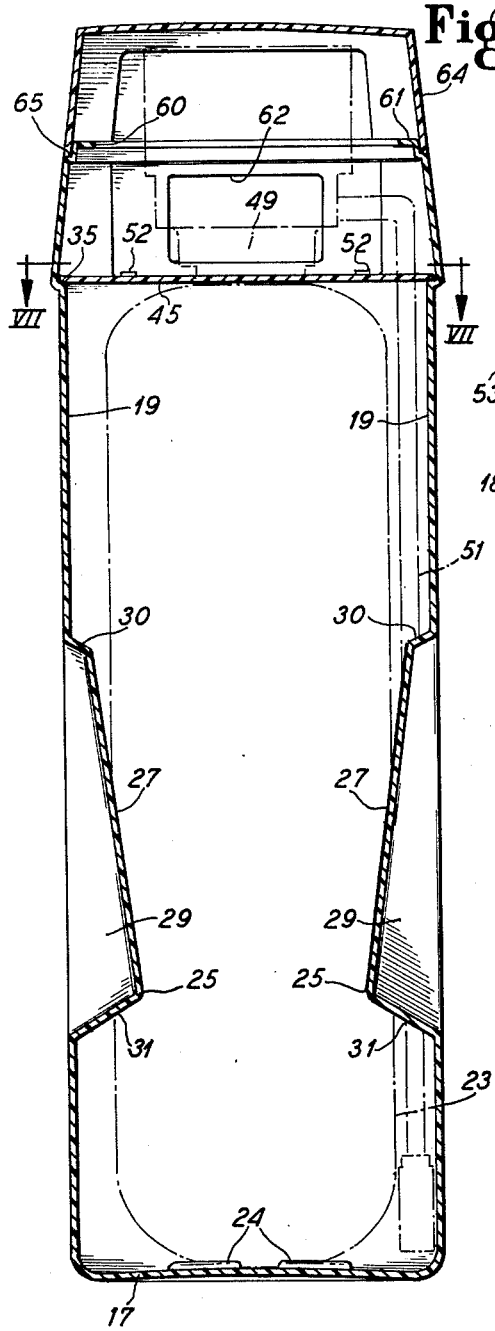
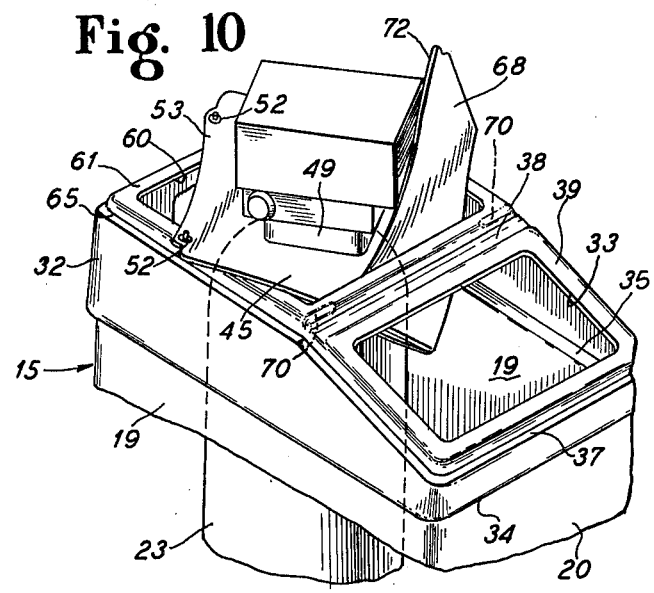
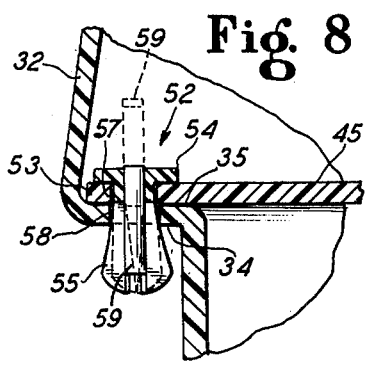
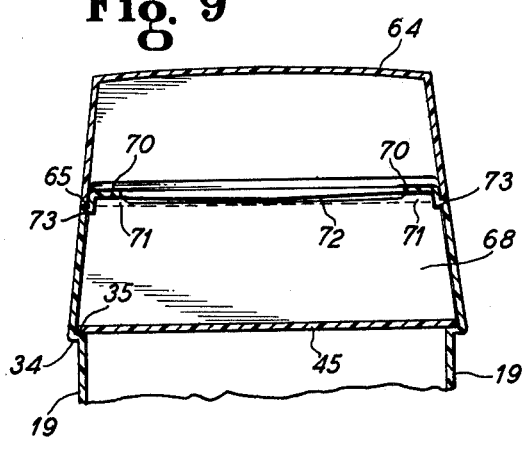

COMBINATION WATER SOFTENER CABINET AND BRINE RECEPTACLE

This invention relates to a new and improved combination water softener cabinet and brine tank.

As heretofore constructed, combination water softener cabinet and brine tank constructions have suffered from various inadequacies both as to cost and performance. Costwise, they have required too many parts and generally costly assembly operations. In performance prior arrangements have been wanting in a number of respects, among which may be mentioned no, or at least inadequate, provision for safe shipment and installation handling of the cabinet with the resin tank assembled therein, that is, the cabinet serving as, in effect, a shipping and handling container for the resin tank and its associated cycle controlling mechanism. In service, the cycle controlling mechanism must be protected not only against salt fumes generated in the brine tank area of the cabinet, but should also be protected against salt contamination during charging of the brine tank area with salt. Protection against salt during the charging process is especially deficient in some prior constructions. In some prior constructions, access to the cycle controlling mechanism for adjustments and the like is not as convenient as it should be.

It is, accordingly, an important object of the present invention to overcome the disadvantages, deficiencies, inefficiencies, shortcomings, and problems inherent in prior combination water softener cabinets and brine tanks, and to provide a new and improved construction of this type.

Another object of the invention is to provide a new and improved, light weight, sturdy combination water softener cabinet and brine tank having novel means for protectively isolating the softener cycle controlling mechanism of a resin tank housed therein from salt and salt fume comtamnation.

A further object of the invention is to provide a new and improved economical combination water softener cabinet and brine tank construction involving a minimum number of easily assembled parts.

Still another object of the invention is to provide a new and improved combination water softener and brine tank structure which is especially suitable to serve as a shipping and handling container for the resin tank and its associated mechanism.

According to features of the invention, a combination water softener cabinet and brine tank comprises a cabinet dimensioned to receive and house a water softener resin tank in one area of a substantial space enclosed by the cabinet, said space also providing a substantial brine containing area alongside said resin tank area, an upper portion of the cabinet comprising structure defining a salt-charging opening over the brine containing area; and means on the structure providing a resin tank locating, retaining and hold-down device over the resin tank housing area, such means also defining with the structure an isolation chamber for protecting resin tank mounted softening cycle controlling mechanism against brine fume damage and against contamination from salt during charging of salt through said opening into the brine containing area.

According to other features of the invention, a combination water softener cabinet and brine tank comprises a cabinet adapted to house an upright water softener resin tank, and the cabinet has bottom, back, opposite side and front walls and top closure means; and respective inwardly projecting means on the side walls intermediate the front and rear walls and spaced above the bottom wall for cooperating in maintaining the resin tank in an assembled position in the cabinet between the back wall and the inwardly projecting means.

Other objects, features and advantages of the invention will be readily apparent from the following description of certain representative embodiments thereof, taken in conjunction with the accompanying drawings although variations and modifications may be effected without departing from the spirit and scope of the novel concepts embodied in the disclosure and in which:

FIG. 1 is a perspective view of a combination water softener cabinet and brine tank embodying features of the invention;

FIG. 2 is an enlarged vertical sectional elevational detail view taken substantially along the line II—II of FIG. 1;

FIG. 3 is a fragmentary horizontal sectional view taken substantially along the line III—III of FIG. 2.

FIG. 4 is a view similar to FIG. 3 but showing a modification;

FIG. 5 is a perspective view showing a resin tank having the tank locating, retaining, and hold down device preassembled therewith;

FIG. 6 is a vertical sectional detail view taken substantially along the line VI—VI of FIG. 3.

FIG. 7 is a horizontal sectional view taken substantially along the line VII—VII of FIG. 6;

FIG. 8 is an enlarged sectional detail view of substantially the area identified at VIII in FIG. 2;

FIG. 9 is a fragmentary vertical sectional detail view taken substantial along the line IX—IX of FIG. 7; and FIG. 10 is a fragmentary perspective view demonstrating a method of assembling the brine tank locating, retaining, and hold down device with the cabinet.

A combination water softener cabinet and brine tank according to the invention and as exemplified in the drawings comprises a cabinet body 15 (FIG. 1) in the form of a generally upwardly opening container desirably molded in one piece from suitable plastic material such as high impact polypropylene or high density polyethylene and having a bottom wall 17 (FIGS. 2 and 3) of generally rectangular form longer in a front to rear direction and having upstanding therefrom a rear wall 18, opposite side walls 19 and a front wall 20. In its lower portion, the front wall 20 is desirably provided with an inset toe space 21 which runs a short distance into the adjacent lower portions of the side walls 19 and is defined along its upper side by an offsetting reinforcing juncture bend 22 stiffening and reinforcing the lower portion of the front wall.

The dimensions of the cabinet 15 are such as to receive and house a resin tank 23 in one area, herein the rearmost area of a substantial space enclosed within the cabinet structure, and which space also provides a substantial brine containing area alongside the resin tank area, more particularly in the front portion of the cabinet space. Where, as is generally true, the tank 23 is of cylindrical form throughout most of its length some brine containing space may also be present at the opposite sides of the tank. It will be appreciated that the tank 23 may be of any preferred construction suitable to withstand a substantial ion exchange resin load and water pressure. The tank 23 may have an external casing of fiberglass or other suitable material which is inert to brine B and salt S within the brine containing area and in which the tank is immersed in service.

In order to permit the cabinet 15 to be used effectively as a shipping and handling container with the tank 23 assembled therein, means are provided within the cabinet for maintaining the tank 23 in position. To this end, the bottom wall 17 has tank-bottom-retaining means in the form of an interrupted circle of integral upwardly projecting rib means 24 providing a cradle socket receptive of the bottom of the tank 23 which, as is customary, is of convex form and is therefore cradled within the socket. Desirably the rib structure 24 is molded integrally with the bottom walls 17. In addition, inward retaining projections 25 are provided on the side walls 19 (FIGS. 2, 3 and 6). In a preferred construction, the projections 25 are molded integrally as insets in the side walls 25 suitably located intermediate the rear wall 18 and front wall 20 and shaped not only to provide the desired tank retaining function but also to afford desirable reinforcement for the side walls especially against bulging due to load pressure of the salt S and the brine B. For this purpose, the projections 25 are of generally vertically elongated shape and spaced above the bottom wall 17 but substantially below the top of the cabinet 15 so as to engage the cylindrical wall of the tank 23 intermediate its height. Two points of engagement of the tank 23 by the projections 25 in a three point retaining engagement wherein the back wall 18 provides the third point of engagement. In a preferred form, the projections 25 comprise a plurality of angularly related surfaces including an inner panel surface 27 which is connected in spaced relation to the respective side wall 19 by an angular rear panel surface 28, a front angular panel surface 29, a top angular panel surface 30 and a bottom angular panel surface 31. By preference, the inwardly offset panel surface 27 is formed on a downwardly and inward slope, in each instance, as best seen in FIG. 6. By having the projections 25 spaced substantially above the bottom wall 17, free brine circulation is permitted within the brine tank space within the cabinet 15. Through this arrangement, the lower portion of the tank 23, at least, is thoroughly retained against lateral displacement from the desired position within the cabinet.

If it is desired to install within the cabinet 15 a resin tank 23' (FIG. 4) of smaller diameter than the tank 23, retention of the tank 23' against lateral displacement may be effected in cooperation with the base socket defined by the rib structure 24 by placing filler blocks 23a between the projections 25 and a filler block 23b between the tank and the back wall 18. Suitable material for the blocks 23a and 23b comprises rigid plastic (polystyrene) foam.

An upper portion 32 of the cabinet 15 comprises structure defining a salt-charging opening 33 (FIGS. 2 and 10) over the brine containing area within the cabinet. In a preferred form, the upper portion structure 32 comprises generally upward extension of the walls of the cabinet 15 offset by a horizontal reinforcing flange 34 providing an upwardly facing ledge 35. About its top the structure 32 is formed with an insert rabbet 37 providing reinforcement and defining an upwardly facing ledge shoulder or seat. To facilitate access into the charging opening 33, the front portion of the structure 32 about the opening 33 is on a generally oblique slope extending downwardly and forwardly from a transverse upwardly opening groove 38 along the upper end of the sloping portion, with a flange area 39 surrounding and outlining the opening 33 and providing a substantial reinforcement cooperating with the flange 34 and the rabbet 37 in stiffening the upper portion 32 of the cabinet. Normally, the opening 33 is adapted to be closed by a removable closure member 40 having means for maintaining it against lateral displacement comprising a peripheral downturned flange 42 along its side and front edges engaging in the rabbet 37, and an inset 43 adjacent its front end cooperating with the adjacent portion of the opening-defining flange 39 to hold the closure against forward displacement and providing a finger grip depression 44 facilitating manipulation of the closure for removal and replacement as necessary.

Means comprising a plate 45 on and in cooperation with the upper structure 32 provides a softener tank locating, retaining and holddown device over the resin tank area of the cabinet 15. In a preferred form, the plate 45 has an opening 47 just large enough to accommodate a reduced diameter collar 48 on the lower end portion of a body 49 carried on the upper end of the tank 23 and supporting water softener cycle controlling mechanism of any preferred form. Adjacent to one side, the plate 45 has another smaller opening 50 (FIG. 7) for passage of a screen-equipped brine duct 51 (FIGS. 2, 6, 3 and 5) for effecting communication between the body of the brine tank area within the cabinet and the cycle controlling mechanism supported by the body 49. Assembly of the plate 45 with the tank 23 may be effected after the tank 23 is inserted into the cabinet 15 and before the mechanism body 49 has been installed on the tank. On the other hand, the construction and arrangement of the plate 45 and the upper portion 32 of the cabinet are preferably such that the plate 45 may be assembled with the tank 23 and the mechanism body 49 substantially as shown in FIG. 5, before insertion of the tank into the cabinet 15.

In the assembled relationship within the cabinet 15, the plate 45 is dimensioned to be received on the ledge 35 which is located at about the height of the top of the tank 23, as best visualized in FIGS. 2, 6 and 7. At its sides, the plate 45 simply rests on the ledge 35. Along its rear end, the plate 45 rests on the portion of the ledge 35 along the rear wall 18 and is desirably provided with means for securing the plate to the ledge. Although the ledge 35 may be relatively narrow throughout most of its extent, in order to accommodate fastening means 52 the ledge in at least a substantial portion along the rear wall 18 is wider and receives a rearward extension 53 of the plate 45. In one desirable form, the fastening means 52 comprise blind rivets of the type molded from plastic and having a head 54 and an integral multi-locking finger stem 55 extending through a respective aperture 57 in the plate portion 58 and in assembly projecting through an aligned complementary aperture 58 in the shoulder ledge 35. During assembly, the fingers of the stem 55 are permitted to flex toward one another to enable passage through the aligned apertures 57 and 58, as shown in dash outline in FIG. 8. Then a locking pin 59 is pressed from a retracted position as shown in dash outline position, whereby the fingers are maintained in a spread-apart relation wherein shoulders thereon hold the rivet against withdrawal, thus maintaining a secured position of the plate 45. If it is desired to remove the plate 45, the pin 59 can be driven into retracted position and the rivet fastener 52 can then be withdrawn from the ledge 35 to release the plate.

In addition to the opening 33, the top structure 32 has an access opening 60 in its rear portion over the resin tank area of the cabinet 15 and defined by a reinforcing flange 60 similar to the flange 39 which defines the opening 33. In molding the cabinet 15, blow molding techniques may be employed wherein the cabinet comes out of the mold as a completely enclosed hollow member, wherein the openings 33 and 60 are then cut. At the same time an opening 62 may be cut in the upward extension portion of the rear wall 18 in the upper structure 32 for clearance of conduits 63 customarily connected to the tank-carried cycle controlling mechanism as installed in a water softener system. A protective and ornamental cover 64 may be applied over the opening 60 and the softener controlling mechanism, a front lower edge of the cover being received in the groove 38 adjacent the back edge of the closure 40, and remaining lower edges of the cover 64 seated in a reinforcing shoulder rabbet 65.

Inasmuch as the openings 33 and 60 are both shorter and narrower than the dimensions of the plate 45, the plate 45 is constructed and arranged to be flexibly warped and passed through either of the openings. That is, the plate 45 is so resiliently flexibly constructed that it can be inserted into the cabinet 15 before assembly with the tank 23 and the controlling mechanism body 49 by manually flexibly deflecting the plate and bendably distorting it to small enough dimensions to enable thrusting it through either of the openings 33 or 60. If, as generally preferred the plate 45 is preassembled with the tank 23 and the control mechanism body 49 as shown in FIG. 5, then the tank can be inserted into the cabinet through the opening 60, and the plate 45 flexibly warped and forced through the opening 60 into position in the manner exemplified in FIG. 10. During this assembly operation such portions as necessary of the plate 45 are resiliently bent up toward the control mechanism body 49 or down toward the resin tank top sufficiently to permit the plate 45 to slip into the opening 60 past the flange 61. Once inside the cabinet confines, the plate 45 springs into its normal substantially flat condition to be received marginally on the ledge 35. In a construction providing for the desired resilient flexibility in the plate 45 but at the same time providing it with the desired thickness for ample rigidity to serve its tank locating, retaining and hold-down function, the plate may be injection-molded or die cut from sheet of suitable plastic such as high density polyethylene, polypropylene or other suitable polyolefin. Such materials can practically be provided with adequate flexibility and memory factor to serve the purpose.

An additional function of the plate 45 is to define with the top structure 32 of the cabinet 15 an isolation chamber 67 for protecting the resin tank-carried water softener cycle controlling mechanism against brine fume damage and against contamination from salt during charging of salt through the opening 33 into the brine containing area of the cabinet. For this purpose, the front end portion of the plate 45 is constructed to provide a valve or baffle extension 68 which is connected by an integral hinge 69 to the body of the plate and is of complementary width and length to fit reasonably snugly against the upward extensions from the side walls 19 above the ledge 35 (FIG. 6) and to engage closingly with the overlying portion of the top structure 32 (FIG. 2). By virtue of the hinge 69, the baffle extension 68 can be hingedly swung between an open position as shown in dash outline in FIG. 2 whereby an access passage is provided into the chamber 67, and a closed position as shown in full outline. In the closed position the baffle extension is releasably latched by means comprising respective shallow, downwardly opening latching sockets 70 in the front margin of the flange 61 within which tabs 71 (FIGS. 2, 5 and 9) on the distal edge 72 of the baffle extension engage releasably. There are respective clearances 73 at each side of the tongue 72 to clear the overhanging rabbet formation 65. By virtue of the resilient flexibility of the extension 68, the tabs 71 can be readily snapped into and out of the sockets 70 with moderate manual pressure. It will be apparent that when the flap-like baffle extension 68 is in its raised latched position, the isolation chamber 67 is protectively closed off from the remainder of the interior space within the cabinet 15, and the baffle extension 68 defines with the forward portion of the top structure 32 an ample passage for reception of salt into the brine space within the cabinet from the charging opening 33.

It will be understood that variations and modifications may be effected without departing from the spirit and scope of the novel concepts of this invention.

I claim as my invention:

1. A cabinet comprising a plastic molding and having a bottom wall and integral upstanding rear, side and front walls defining a substantial housing space a lower portion of which is adapted to serve as a brine receptacle, a rear area of said housing space being receptive of an upright water softener resin tank provided on its upper end with softener cycle controlling mechanism, and a front area within the housing space being receptive of salt for the brine receptacle, the cabinet including:

top structure comprising upward extensions of said upstanding walls of the cabinet and providing a rear opening over said rear for access to the cycle controlling mechanism, and a salt-charging front opening over said front area;

a transverse separating section of said top structure between said front and rear openings and defining the front edge of said rear opening and the rear edge of said front opening;

a rear cover over said rear opening and engaging said top structure including said transverse section adjacent to said top opening rearwardly from said front opening;

a front cover over said front opening engageable with said top structure including said transverse area forwardly from said rear opening whereby said front cover can be removed independently of said rear cover when it is desired to charge salt through said front opening into said brine tank;

a generally horizontal closure and baffle plate below said rear opening for closing said rear area over the softener resin tank and under the cycle control mechanism, said rear and front openings being smaller than said plate, and said plate being resiliently flexible so that it can be deflected for passing it through either of said openings;

said closure and baffle plate having an opening to receive therethrough a part of the cycle control mechanism adjacent to the top of the tank;

edges of the plate engaging with said rear and side walls at a level substantially below said rear opening of said top structure;

a generally upwardly projecting baffle extension on the front edge of said plate engaging with said transverse separating section of said top structure between said front and rear openings whereby to define with said top structure and said rear cover a chamber within which said cycle controlling mechanism is substantially isolated and protected from fumes from said brine receptacle and also from salt during charging of salt through said salt charging opening into said brine receptacle;

an integral hinge connecting said baffle extension to said front edge of the plate and enabling swinging of the plate from a position generally planar with the plate to said generally upwardly projecting position;

latching means on the free end of said baffle extension and said transverse separating section cooperating for holding the baffle extension in its generally upward chamber closing and baffle position when swung up from said planar position;

and means for maintaining the resin tank in an upright position including respective inward retaining projections on said side walls intermediate said front and rear walls above said bottom wall for engaging and maintaining the resin tank in assembled position in said rear area adjacent to said rear wall.

2. A cabinet according to claim 1, including an upwardly facing seat on said rear and side walls and at least in part comprising an upwardly facing ledge, and means securing the plate to said ledge.

3. A cabinet according to claim 1, wherein said side wall projections comprise reinforcing inset formations vertically elongated and molded integrally with said side walls.

4. A cabinet according to claim 3, including filler means at said projections and said rear walls for maintaining in position a softener resin tank of a diameter too small to engage directly with said rear wall and said projections.

5. A cabinet according to claim 1, wherein said bottom wall has retaining formations molded thereon and projecting upwardly in said rear area for receiving the bottom of the resin tank for retaining the tank in position.

6. A cabinet according to claim 1, wherein said top structure about said front opening slants downwardly and forwardly from said transverse separating section whereby to facilitate charging of salt through said front opening when said front cover is removed from said front opening.

* * * * *